US 6,602,936 B1

(12) United States Patent
Arnoux et al.

(10) Patent No.: US 6,602,936 B1
(45) Date of Patent: Aug. 5, 2003

(54) CASTING RESIN AND PROCESS FOR THE FABRICATION OF RESIN MOLDS

(75) Inventors: Didier Arnoux, Chalabre (FR); Roman Gattlen, Birsfelden (CH); Peter Hochwald, Wehr (DE)

(73) Assignee: Vantico, Inc., Brewster, NY (US)

( * ) Notice: Subject to any disclaimer, the term of this patent is extended or adjusted under 35 U.S.C. 154(b) by 0 days.

(21) Appl. No.: 09/703,787

(22) Filed: Nov. 1, 2000

(30) Foreign Application Priority Data

Nov. 22, 1999 (GB) .............................. 9927431

(51) Int. Cl.⁷ .............................. C08K 3/08; C08L 63/00
(52) U.S. Cl. .................... 523/457; 523/440; 524/441
(58) Field of Search ................ 523/440, 457; 524/441; 528/73

(56) References Cited

U.S. PATENT DOCUMENTS

| 4,218,360 A |   | 8/1980 | Burhans et al. ............... 260/37 |
| 4,382,803 A |   | 5/1983 | Allard |
| 4,564,651 A |   | 1/1986 | Markert et al. ............. 524/589 |
| 4,847,122 A | * | 7/1989 | Goldberg et al. |
| 5,156,754 A |   | 10/1992 | Nomura et al. ............. 249/134 |
| 5,468,832 A |   | 11/1995 | Schrader et al. |
| 5,686,054 A | * | 11/1997 | Barthel et al. |

FOREIGN PATENT DOCUMENTS

| GB | 830250 | 3/1960 |
| GB | 1321914 | 7/1973 |
| GB | 2195560 | 4/1988 |
| JP | 58213033 A | 12/1983 |
| JP | 1242655 A | 9/1989 |
| WO | 93/12170 | 6/1993 |

* cited by examiner

*Primary Examiner*—Tae H. Yoon
(74) *Attorney, Agent, or Firm*—Proskauer Rose LLP

(57) ABSTRACT

The present invention relates to compositions comprising
 A composition comprising
  (a) a resin containing a polyepoxide and a polyisocyanate, and
  (b) a treated filler which is either a silane-treated filler or an atomised filler,
 The compositions are suitable for the fabrication of high performance resin molds which can then be used for various molding methods such as injection molding, press molding, vacuum molding, high pressure molding or foaming molding.

1 Claim, No Drawings

CASTING RESIN AND PROCESS FOR THE FABRICATION OF RESIN MOLDS

This invention relates to a curable composition based on epoxide/isocyanate mixtures containing specific fillers and to a process for the fabrication of a resin mold.

There is a growing and increasing need for high performance resins for a variety of applications in the home, auto, marine, aero and space industries where molded parts made from strong, light weight polymer resins and composites are required to replace expensive metal parts.

Concomitantly, there is the growing need to utilise the digital design capabilities offered by CAD systems for more rapid turnarounds and short volume (speciality) production of molded parts.

Traditionally, molds to produce molded parts have been made laboriously from wood (by carving), metal (for example machining aluminium) and metalised epoxy/concrete, amongst others. Because of the lengthy procedure involved with these mold making techniques, which also result in much waste material, the resultant methods are used primarily for cost effective long run applications, i.e. for 1000 or more parts being formed from these molds.

The prospect of achieving high performance resins capable of high temperature tolerance, high chemical resistance and mechanical strength combined with low brittleness is receiving great attention because of the possibility of machining these resins under CAD control to manufacture resin molds in a more streamlined work flow.

These resin parts (netsize cast in a polystyrene foam cavity) can then be used—after machinig on the needed shape—for various molding methods such as injection molding, press molding, metallforming, vacuum forming, high pressure molding or molds to make foam parts but also oversized shapes for design and modelling.

Industry movement is towards short run, rapid turn round production of molded parts. The prospect described above of fabricating molds from high performance resins is thus highly sought after.

For resins to be made into effective molds, it is very important that the resin or composite is able to withstand cycled high temperatures and high pressures necessary for repeated molding operations. Although there are reports of resin compositions able to be molded to produce a molded part which has good impact strength and high temperature stability, there is limited art regarding the actual production of resin molds which can usefully serve as molds particularly to produce 200–500 parts.

A mold having a dense and voidless structure prepared from an epoxy resin and metal powder dispersed therein is disclosed in U.S. Pat. No. 5,156,754. This epoxy resin mold, which is particularly suitable for use in an injection molding which subjects the mold to very high injection pressure, exhibits a high heat resistance but has not turned out satisfactory with respect to brittleness and machinability.

U.S. Pat. No. 4,564,651 describes reaction resin molded materials containing oxazolidinone and isocyanurate rings prepared from mixtures of polyepoxides and polyisocyanates, which have good mechanical properties and are suitable for the impregnation of electrical windings and for the casting-in and encapsulation of electrical and electronic components.

WO 93/12170 discloses resin compositions containing a epoxide-isocyanate resin and a metallic filler. These compositions are used as casting resins which are resistant to shrinkage during heating and yield single use products of high heat resistance and hardness.

It has now been found that mixtures of resins containing oxazolidinone and isocyanurate rings prepared from mixtures of polyepoxides and polyisocyanates (EPIC resins) are suitable materials for the manufacture of high performance molds, provided suitably treated fillers are used.

Accordingly in one aspect, the present invention relates to a composition comprising
 (a) a resin containing a polyepoxide and a polyisocyanate, and
 (b) a treated filler which is either a silane-treated filler or an atomised filler.

Because of their good castability at ambient temperature and the good mechanical properties of the cured products, EPIC resins have hitherto been used as casting resins, in particular for the impregnation and encapsulation of electrical and electronic components.

Polyepoxides which can be used for the preparation of EPIC resins are relatively low-viscosity aliphatic, cycloaliphatic or aromatic epoxides as well as mixtures thereof. Examples for suitable polyepoxides are bisphenol-A-diglycidylether, bisphenol-F-diglycidylether, hydrogenated bisphenol-A-diglycidylether, hydrogenated bisphenol-F-diglycidylether, 3,4-epoxycyclohexylmethyl-3',4'-epoxycyclohexanecarboxylate, polyglycidylether of phenol/formaldhyde novolak or cresol/formaldehyde novolak, diglycidyl esters of phthalic, isophthalic or terephthalic acid, hydantoin epoxy resins, triglycidyl-isocyanurate, triglycidyl-p-aminophenol, tetraglycidyldiaminodiphenylmethane, tetraglycidyl-diaminodiphenylether and tetrakis(4-glycidyloxyphenyl)-ethane.

Preferably, the compositions according to the invention contain as component (a) a resin wherein the polyepoxide is a diglycidylether or a diglycidylester.

Particularly preferred polyepoxides are the diglycidylethers of bisphenol A and bisphenol F.

Polyisocyanates useful in the compositions according to the invention include low-viscosity aliphatic, cycloaliphatic or aromatic isocyanates and mixtures thereof.

Diisocyanates are preferred, in particular diisocyanates of the formula OCN—X—NCO, wherein X denotes a bivalent aromatic, cycloaliphatic or aliphatic-cycloaliphatic radical.

Examples for suitable polyisocyanates are 2,4-diphenylmethane diisocyanate, 4,4-diphenylmethane diisocyanate, hexane-1,6-diisocyanate, cyclohexane-1,2-diisocyanate, cyclohexane-1,3-diisocyanate, cyclohexane-1,4-diisocyanate, 4,4'-dicyclohexylmethane diisocyanate, isophorone diisocyanate, phenylenediisocyanate, xylene diisocyanate, toluene-2,4-diisocyanate, toluene-2,6-diisocyanate, naphthalene-1,4-diisocyanate, 4,4'-diphenylether diisocyanate, 4,4'-diphenylsulfone diisocyanate, 2,2-bis(4-isocyanatophenyl)propane and 3,3', 4,4'-diphenylmethane tetraisocyanate.

Polyol-modified polyisocyanates and mixtures of liquid polyisocyanates with higher molecular polyisocyanates or carbodiimide polyisocyanates can also be applied.

Further suitable polyisocyanates are dimers and trimers of the above-mentioned multivalent isocyanates; such polyisocyanates have end-position free isocyanate groups and contain one or more uretdione and/or isocyanurate rings.

Particularly preferred polyisocyanates are phenylenediisocyanate, toluene diisocyanate, biphenyl diisocyanate, isophorone diisocyanate, 2,2-bis(4-isocyanatophenyl)propane and diphenylmethane diisocyanate.

Diphenylmethane 2,4'-diisocyanate and diphenylmethane 4,4'-diisocyanate are the most preferred polyisocyanates.

In a preferred embodiment of the invention, a mixture of low-viscosity EPIC resins with special polyol formulations is used, thus obtaining casting resins with short curing and demolding times. Such compositions are commercially available, e.g. Blendur® I supplied by Bayer.

Purposively, the composition comprising a polyepoxide and a polyisocyanate further contains as component (c) a catalyst which promotes the formation of oxazolidinone and isocyanurate rings.

Suitable catalysts are, for instance, tertiary amines and imidazoles.

Preferable tertiary amines include tetramethylethylene diamine, dimethyloctylamine, dimethylamino ethanol, dimethylbenzylamine, 2,4,6-tris(dimethylaminomethyl)phenol, N,N'-tetramethyldiaminodiphenyl methane, N,N'-dimethylpiperazine, N-methylmorpholine, N-methylpiperidine, N-ethylpyrrolidine, 1,4-diazabicyclo-(2,2,2)-octane and quinolines.

Preferable imidazoles include 1-methylimidazole, 2-methylimidazole, 1,2-dimethylimidazole, 1,2,4,5-tetramethylimidazole, 1-benzyl-2-phenylimidazole, 2-undecylimidazole, 2-heptadecylimidazole, 2-ethyl-4-methylimidazole, 1-cyanoethyl-2-ethyl-4-methylimidazole, 1-cyanoethyl-2-phenylimidazole and 1-(4,6-diamino-s-triazinyl-2-ethyl)-2-phenylimidazole.

In the resin according to component (a) the polyepoxide and polyisocyanate are preferably applied in such amounts that the ratio of epoxy groups to isocyanate groups is in the range of 1:1 to 1:5, in particular 1.0:1.5 to 1.0:4.0.

The amount of the catalyst (c) is advantageously 0.01 parts by weight to 5.0 parts by weight, preferably 0.25 parts by weight to 2.5 parts by weight, per 100 parts by weight of component (a).

Fillers are important to impart greater strength, and impact resistance as well as for economic reasons. Within the scope of the invention special treatment of the fillers is very necessary. Simply drying of the filler is not sufficient.

Silane-treated fillers are known, for example from U.S. Pat. No. 4,357,271, as reinforcing additives for thermoplastic resins. U.S. Pat. No. 5,932,625 discloses that inorganic fillers the surface of which is treated with a silane coupling agent can be incorporated in photo-curable resins based on acrylates.

The preparation of atomised fillers is described in, for example, "Handbook of Fillers for Plastics", page 248, ISBN 0-442-26024-5. According to this technique, which is especially useful for metallic fillers, the filler is decomposed ("atomised") by high-velocity air into small spherical particles. These particles can then further be reduced in a ball mill until the desired fineness is obtained. This produces a surface which does not interact with the epoxy-isocyanate mixtures, thus avoiding bubbling and foaming problems.

Suitable fillers which can be used as component (b) in the compositions according to the invention include inorganic fillers like metals in powder form, metal oxides, hydroxides, carbonates, sulfates, silicates, silica, carbon and glass as well as organic fillers like melamine/formaldehyde resins.

Examples for such fillers are aluminium oxide, calcium hydroxide, magnesium hydroxide, hydrated alumina, titanium dioxide, dolomite, chalk, $CaCO_3$, barite, gypsum, talc, mica, kaolin, wollastonite, bentonite, aerosils, quartz, quartz powder, fused silica, glass powder, glass beads, wood flour, carbon black and powders of aluminium, bronze, copper, iron, steel, lead and zinc.

Preferably the filler is a metal powder.

Suitable metallic fillers are, for example, aluminium, copper, iron and steel; aluminium powder is especially preferred. Atomised aluminium particles, are found to be very effective in providing treated surface compatible with the polyepoxy-polyisocyanate mixture. Untreated aluminium causes bubbling and foaming problems resulting in formation of voids and non-homogeneity.

Several suitable aluminium powders are commercially available for example Alu <63/96% (Eckart), Alu 350TL (Pechiney), Alu 250TV (Pechiney), Alu 416 (Alcan Toyo) and Alu 415N (Alcan Toyo).

In pre-filled EPIC systems which require a good storage stability, it is preferred to use Alu 415N (Alcan Toyo).

The fillers preferably have an average particle diameter of 1–75 μm, in particular 3–40 μm.

The silane treatment of the filler can either be carried out as a separate coating process before incorporation into the resin or it can be carried out in situ during the compounding process using the polymer matrix as a solvent.

Silanes containing no reactive groups are generally quite volatile and filler coating is usually carried out in the gas phase by exposing the filler to their vapours. This ensures maximum reaction with the surface and minimum self-condensation.

On the other hand, silanes having reactive groups like vinyl or amino groups are less volatile and are usually coated from solution of some sort.

In the compositions according to the invention, the silane used for the filler treatment is preferably a compound of the formula I

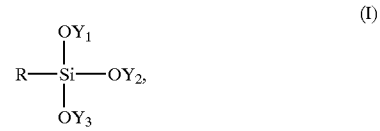

wherein R is a monovalent organic group having 2 to 100 carbon atoms, where one or more than one carbon atom can be replaced by O, S, N or Si atoms and where $Y_1$, $Y_2$ and $Y_3$ are each independently of one another $C_1$–$C_{20}$alkyl, $C_5$–$C_{20}$aryl, $C_6$–$C_{20}$aralkyl, $C_5$–$C_{12}$cycloalkyl, $C_2$–$C_{20}$-alkoxyalkyl or $C_1$–$C_{20}$acyl.

The silanes of formula I are known and can be prepared according to known methods. Some of these silanes are commercially available.

Preferred silanes are those of formula I, wherein R defined as monovalent organic group containing 2 to 100 carbon atoms is $C_1$–$C_{20}$alkyl, $C_5$–$C_{20}$aryl, $C_6$–$C_{20}$aralkyl, $C_5$–$C_{12}$cycloakyl, $C_2$–$C_{20}$-alkoxyalkyl, $C_2$–$C_{20}$alkenyl, $C_4$–$C_{25}$acryloxyalkyl, $C_4$–$C_{25}$methacryloxyalkyl, $C_2$–$C_{20}$-aminoalkyl, $C_4$–$C_{25}$glycidyloxyalkyl, $C_7$–$C_{25}$ epoxycyclohexylalkyl or the radical of a poly-siloxane.

Alkyl defined as R, $Y_1$, $Y_2$ or $Y_3$ typically includes methyl, ethyl, isopropyl, n-propyl, n-butyl, isobutyl, sec-butyl, tert-butyl as well as the different isomeric pentyl, hexyl, heptyl, octyl, nonyl, decyl, undecyl, dodecyl, tridecyl, tetradecyl, pentadecyl, hexadecyl, heptadecyl, octadecyl, nonadecyl and eicosyl groups.

Aryl defined as R, $Y_1$, $Y_2$ or Y3 preferably contains 6 to 10 carbon atoms and can be, for example, phenyl, pentalinyl, indenyl, naphtyl, azulinyl and anthryl.

Aralkyl defined as R, $Y_1$, $Y_2$ or $Y_3$ preferably contains 7 to 12 carbon atoms and, particularly preferably, 7 to 10 carbon atoms and is, for example, benzyl, phenethyl, 3-phenylpropyl, α-methylbenzyl, 4-phenylbutyl and α,α-dimethylbenzyl.

Cycloalkyl defined as R, $Y_1$, $Y_2$ or $Y_3$ is preferably $C_5$–$C_8$cycloalkyl, particularly preferably $C_5$cycloalkyl or $C_6$cycloalkyl. Some examples are cyclopropyl, dimethylcyclopropyl, cyclobutyl, cyclopentyl, methylcyclopentyl, cyclohexyl, cycloheptyl and cyclooctyl.

Typical examples of alkoxyalkyl defined as R, $Y_1$, $Y_2$ or $Y_3$ are 2-methoxyethyl, 2-ethoxyethyl, 2-methoxypropyl, 3-methoxypropyl, 2-ethoxypropyl and 3-ethoxypropyl.

Alkenyl defined as R typically includes propenyl, isopropenyl, 2-butenyl, 3-butenyl, isobutenyl, n-penta-2,4-dienyl, 3-methyl-but-2-enyl, n-oct-2-enyl, n-dodec-2-enyl, isododecenyl, n-octadec-2-enyl and n-octadec-4-enyl.

Typical examples of acryloxyalkyl and methacryloxyalkyl are 2-acryloxyethyl, 2-methacryloxyethyl, 3-acryloxypropyl and 3-methacryloxypropyl.

Suitable aminoalkyl groups are, for example, 2-aminoethyl, 3-aminopropyl, 3-aminobutyl and 4-aminobutyl.

Suitable glycidyloxyalkyl groups can be, for example, 2-glycidylethyl, 3-glycidylpropyl, 3-glycidylbutyl and 4-glycidylbutyl.

Epoxycyclohexylalkyl is preferably β-(3,4-epoxycyclohexyl)ethyl.

R in formula I is preferably methyl, ethyl, n-octyl, vinyl, 3-mercaptopropyl, 3-aminopropyl, 3-glycidyloxypropyl, 3-acryloxypropyl, 3-methacryloxypropyl, β-(3,4-epoxycyclohexyl)ethyl, N-(β-aminoethyl)-3-aminopropyl, 3-ureidopropyl, 3-isocyanatopropyl, $H_2N$—$CH_2CH_2NH$—$CH_2CH_2NH$—$CH_2CH_2CH_2$—, $(CH_3O)_3Si$—$CH_2CH_2CH_2NH$—$CH_2CH_2CH_2$— or a group formula

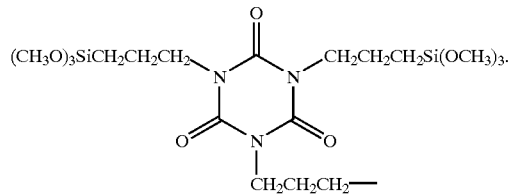

Particularly preferred are silanes of formula I, wherein R is methyl, vinyl, 3-mercaptopropyl or 3-aminopropyl.

$Y_1$, $Y_2$ and $Y_3$ in formula I are preferably methyl, ethyl, acetyl or 2-methoxyethyl.

Illustrative examples of suitable silanes of formula I are octyltriethoxysilane, methyltriethoxysilane, methyltrimethoxysilane, tris[3-(trimethoxysilyl)propyl] isocyanurate, vinyltriethoxysilane, vinyltrimethoxysilane, vinyl-tris(2-methoxyethoxy)silane, γ-methacryloxypropyltri-methoxysilane, β-(3,4-epoxycyclohexyl) ethyltrimethoxysilane, γ-glycidyloxypropyl-trimethoxysilane, γ-mercaptopropyltrimethoxysilane, γ-aminopropyltriethoxysilane, γ-aminopropyl-trimethoxysilane, N-(β-aminoethyl)-γ-aminopropyltrimethoxysilane, $H_2NCH_2CH_2NHCH_2CH_2NHCH_2CH_2CH_2Si(OCH_3)_3$, bis[γ-(trimethoxysilyl)propyl]amine, organically modified polydimethylsiloxane of formula

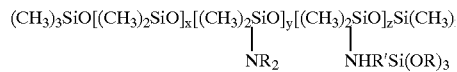

where R and R' are alkyl or aryl, γ-ureidopropyltrimethoxysilane, γ-isocyanatopropyltriethoxysilane, 3-chloropropyltrimethoxysilane, 3-triethoxysilylpropyl succinic anhydride, 3-methacryloxypropyltrimethoxysilane, vinyltris(2-methoxyethoxy)silane, vinyltriacetoxysilane, 3-mercaptopropyltrimethoxysilane, 3-glycidyloxypropyltriethoxysilane, 3-(2-aminoethylamino) propyltrimethoxysilane and 3-(2-aminoethylamino) propylmethyldimethoxysilane.

The amount of the treated filler in the compositions according to the invention is advantageously 30 to 400 parts by weight, preferably 50 to 300 parts by weight, per 100 parts by weight of component (a).

The treated fillers mix very well with the EPIC resins to form homogeneous mixtures without voids or defects. These mixtures then can be cured at low temperatures without exotherming. And hence the low temperature needed for the polymer net-work cure process enables the use of low cost starting moulds made from thermoplastic materials, such as expanded polystyrene foam, which material imparts the additional benefits of quick and complete removal at de-moulding time. The density of the polystyrene foam is preferably 0.01–0.05 g/cm$^3$)

Accordingly, a further object of the invention is a process for the fabrication of a resin mold which comprises (A) shaping an intermediate oversized model-cavity into a polystyrene foam, (B) coating this cavity with a polyurea gelcoat or another solvent free coat which does not feed the PS foam, (C) curing at ambient temperature and applying a wax release agent on the cured film, (D) filling the protected cavity with a composition containing an EPIC resin and a treated filler, (E) curing at ambient temperature, (F) demolding the cast resin piece and curing at progressively higher temperatures to the fully crosslinked state.

The cured product obtained by this process may be a mold directly, which excels in high temperature tolerance, high chemical resistance and mechanical strength in combination with low brittleness.

These outstanding properties further establish the possibility of machining these cured resins under CAD (Computer Aided Design) control to manufacture resin molds in a streamlined work flow.

The CAD machining process generally requires that the filled resins have few voids or any other defects. Also the CAD machining itself should not introduce fracture defects which may limit the useful life-time of the final resin mold.

Further the machined resin mold itself has to withstand, without fracturing, repeated cycles of hot pressing and demoulding readily with polymer or metal sheeting materials.

It has been found that the filled resins according to the invention perform exceptionally well under the CAD machining environment to produce high resolution molds which yield required repeatable molding action.

The invention therefore further relates to the above-described process for the fabrication of a resin mold which further comprises (G) CAD machining the cured cast into a final mold.

Previously it has not been possible to produce high performance plastics molds using low cost disposable starting moulds. Aluminium has tended to be used to produce the mold, with the consequent associated difficulties and greater cost involved in preparing a starting mould which has to withstand >600° C.

The process according to the invention allows the application of the cheap and easily processible polystyrene.

The intermediate disposable mold prepared in step (A) of the claimed process may or may not contain a master model.

In case a master model is applied, CAD machining of cured cast is not necessary.

Prior to step (C), the disposable mold which may or may not contain a master model is coated with a release agent.

With the resin mixtures according to the invention, it has been particularly found that for step (B) cured polyurethane gel-coats act as very efficient protective agents which are not reacted with the curing EPIC mold resin.

The invention further relates to the mold obtained by the process described above.

The following examples are illustrative of the present invention and are therefore not intended as a limitation of the scope thereof.

EXAMPLE 1

1.1 Preparation of the Casting Mixture 25 kg of Casting Resin C305 (EPIC resin based on bisphenol A diglycidylether and diisocyanatodiphenylmethane, filled with atomised aluminium 415N from ALCAN TOYO) is heated to 30° C. and mixed with 0.275 kg of Catalyst D973 (tertiary amine) with an electrical stirrer. The homogenous mixture is then ready to cast.

Alternatively, the unfilled EPIC S 301 is put in a high speed or planetary mixer, drying agent (molecular sieves) and aluminium powder are added, then the mixture is stirred until 40° C. is reached (self heating by stirring power).

1.3 Formation of the Filled EPIC Cast

The prepared resin mixture is poured into the urethane coated and wax released cavity and cured over night at ambient temperature. The precured cast piece is demolded the day after and put into an oven at 40–60° C. and cured fully under the following conditions:

2h/80° C.; 2h/120° C.; 2h/160° C.; 4h/200° C.

The net size cast piece is now ready for machining with CAD control to the required final mold design.

An excellent resolution of 400 mm (casting layer) is achieved without any voids.

EXAMPLE 2

Example 1 is repeated, but with an additional metal spray (Zn alloy, 3 mm thick) on the mold.

EXAMPLES 3 and 4

Example 1 is repeated, but an EPIC resin without any filler (Example 3) and with untreated aluminium granules (Example 4) is used.

The results of the injection molding process using the molds prepared in Examples 1–4 and different types of polymers are summarised in Table 1.

TABLE 1

| Ex. | Filler | Comment on Formulation | G1c (J/m$^2$) Ambient | K1c (MPa m$^{1/2}$) Ambient | Mold Result Polymer type: Tool Temp: No of parts: Surface Finish of Parts |
|---|---|---|---|---|---|
| 1 | Atomised Aluminium 5–75 μm | Homogeneous Casting Mixture | 700 +/− 40 | 2.7 +/− 0.1 | A: 65C: 500: excellent<br>B: 55C: 500: Very good<br>C: 68C: 500: —<br>D: 95C: 390: Slightly rough surface<br>E: 88C: 265: Slightly rough surface |
| 2 | As Example 1, but with metal spray on mold. HEK-MCP400 Zn Alloy 3 mm Thick | As Example 1 | (700 +/− 40) | (2.7 +/− 0.1) | A: 40C: 100: rough surface<br>B: 53C: 500: —<br>C: 54C: 500: —<br>D: 56C: 75: (metal surface damage)<br>E: >90C: — cracks in surface |
| 3 | None | Homogeneous resin mixture | 63 +/− 7 | 0.52 +/− 0.05 | Fractures |
| 4 | Untreated Aluminium Granules | Bubbling and foaming Inhomogeneous | — | — | (Brittle, friable) |

INJECTION MOLD POLYMER TYPE
A: polypropylene PP lowmpt: Hostalen PPW 1780S2A
B: PP + 30% Glass Fibres (PPGF30): Hostalen PPW 1780 S2A + Hostacom G2U02
C: Acrylonitrile-butadiene-styrene ABS: Terluran 958 I, low mpt
D: Polyamide66: PA66 Ultramid A3K, high mpt
E: Polyamide66 + 30% Glass Fibres PPGF30

Subsequently, D 970 catalyst is added. The homogenous mixture is then ready to cast.

1.2 Manufacturing of a Temporary Mold-cavity

A piece of EPS (expanded polystyrene) foam (density 0.01–0.05 g/cm3) is shaped in an oversized cavity . The cavity is protected with a solvent flexibel polyurea gelcoat (Ureol 6118 A/B or Ureol 6435 A/B) and cured at ambient temperature. On the dry protection film (1–2 mm thick) a wax release agent (QZ 5111 or QV 5110) is applied.

As clearly seen, the treated aluminium filled mold performs remarkably well, without needing any additional metal surface treatment to aid de-molding.

What is claimed is:

1. A composition comprising
   (a) a resin containing a polyepoxide and a polyisocyanate in a ratio of epoxy groups to isocyanate groups of between 1:1 to 1:5, and
   (b) atomized aluminum powder.

* * * * *

UNITED STATES PATENT AND TRADEMARK OFFICE
CERTIFICATE OF CORRECTION

PATENT NO. : 6,602,936 B1
DATED : August 5, 2003
INVENTOR(S) : Didier Arnoux et al.

It is certified that error appears in the above-identified patent and that said Letters Patent is hereby corrected as shown below:

Column 2,
Line 25, please replace "formaldhyde novolak or cresol/formaldehyde novolakl," with --formaldehyde novolak or cresol/formaldehyde novolak, --

Column 5,
Lines 56-60, the formula should appear as follows:

Column 6,
Line 17, replace "preferably 0.01-0.05 g/cm$^3$)" with -- preferably 0.01-0.05 g/cm$^3$ --.

Column 7,
Line 64, replace "cavity is protected with a solvent flexibel polyurea gelcoat" with -- cavity is protected with a solvent flexible polyurea gelcoat --.

UNITED STATES PATENT AND TRADEMARK OFFICE
CERTIFICATE OF CORRECTION

PATENT NO. : 6,602,936 B1
DATED : August 5, 2003
INVENTOR(S) : Didier Arnoux et al.

It is certified that error appears in the above-identified patent and that said Letters Patent is hereby corrected as shown below:

<u>Column 8,</u>
Table 1, Example 1, should appear as follows:

| -- Atomised Aluminum 5-75 $\mu$m | Homogenous Casting Mixture | 700+/- 40 | 2.7 +/- 0.1 | A:65C:500:excellent B:55C:500: Very good C:68C:500: D:95C:300:Slightly rough surface E:88C:265:Slightly rough surface -- |

Example 3, should appear as follows:

| -- | None | Homogenous Resin mixture -- | 63+/- 7 | 0.52 +/- 0.05 | Fractures |

Signed and Sealed this

Sixth Day of July, 2004

JON W. DUDAS
*Acting Director of the United States Patent and Trademark Office*